US012311532B1

(12) United States Patent
Tahmazyan et al.

(10) Patent No.: US 12,311,532 B1
(45) Date of Patent: May 27, 2025

(54) INTERLOCKING LIFTING TOOL

(71) Applicant: Anduril Industries, Inc., Costa Mesa, CA (US)

(72) Inventors: Edvard Tahmazyan, Santa Ana, CA (US); Grant Hauser, Costa Mesa, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 941 days.

(21) Appl. No.: 17/461,010

(22) Filed: Aug. 30, 2021

(51) Int. Cl.
*B25J 15/00* (2006.01)

(52) U.S. Cl.
CPC .................. *B25J 15/0033* (2013.01)

(58) Field of Classification Search
CPC ................................... B25J 15/0033
See application file for complete search history.

(56) References Cited

U.S. PATENT DOCUMENTS

| | | | | |
|---|---|---|---|---|
| 3,722,941 A * | 3/1973 | Seiple | ....................... | B63C 7/20 294/66.1 |
| 4,304,433 A * | 12/1981 | Langowski | ............. | E21B 19/14 294/115 |
| 4,445,719 A * | 5/1984 | Miller | ....................... | B63C 7/20 294/66.1 |
| 6,257,634 B1 * | 7/2001 | Wei | ........................... | E01H 1/12 294/111 |
| 10,434,662 B2 * | 10/2019 | Jalenques | .............. | B25J 15/086 |

FOREIGN PATENT DOCUMENTS

DE 202012101636 U1 * 7/2012 ............... B25B 7/02

* cited by examiner

*Primary Examiner* — Stephen A Vu
(74) *Attorney, Agent, or Firm* — Knobbe, Martens, Olson & Bear, LLP

(57) ABSTRACT

A system includes two or more clamp jaws. The two or more clamp jaws are configured to lock around the object in response to the object being pressed against the inner profile of the clamp jaw. The two or more clamp jaws unlock by moving a wedge lock key from a locking position. The wedge lock key prevents the two or more clamp jaws from moving in response to the wedge lock key being in the locking position.

19 Claims, 12 Drawing Sheets

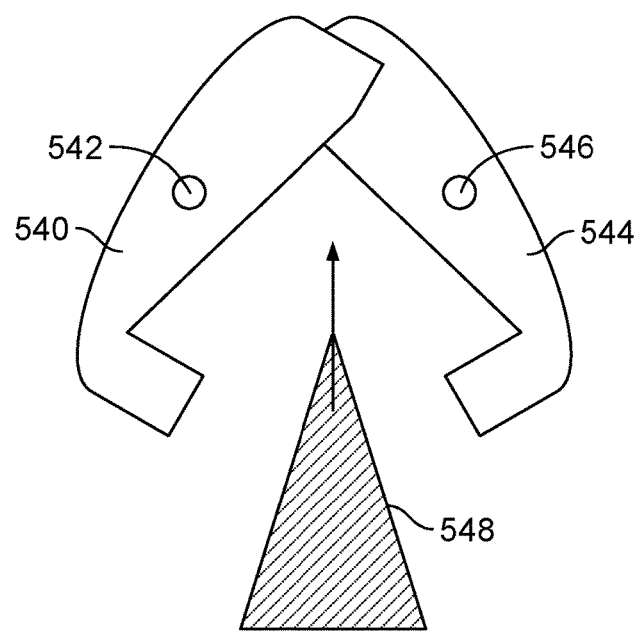
FIG. 5C
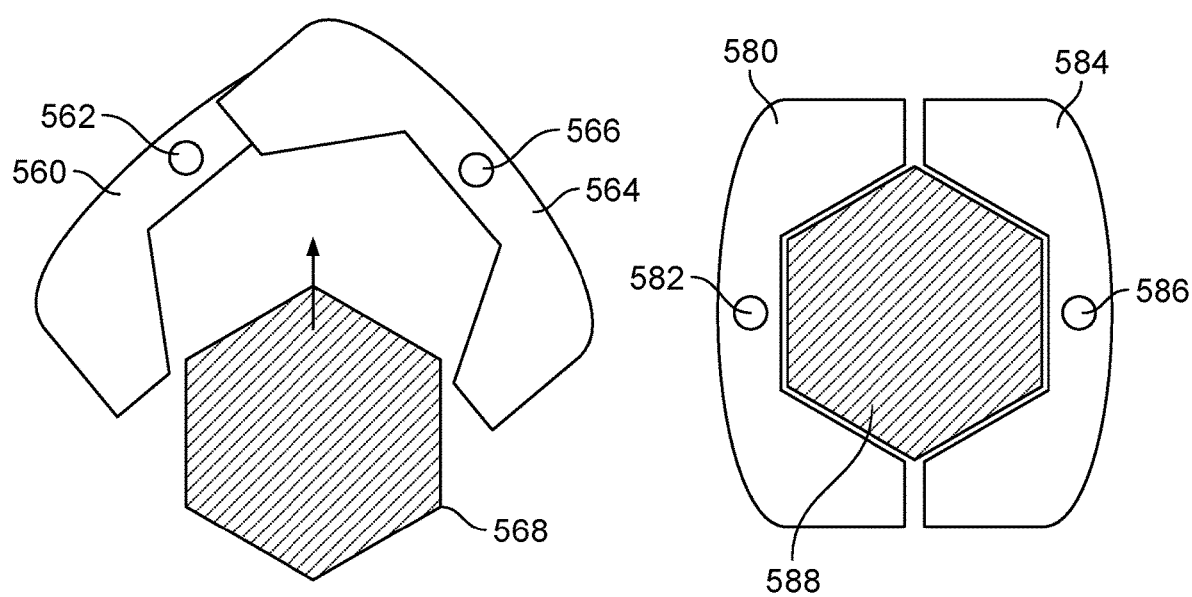
FIG. 5D
FIG. 5E

INTERLOCKING LIFTING TOOL

BACKGROUND OF THE INVENTION

Heavy objects can be difficult to quickly and safely secure to a lifting tool (e.g., for the purpose of hoisting and maneuvering the object) without the use of additional tools or without using more than one hand. In addition, it is difficult to rotate the object once lifted.

BRIEF DESCRIPTION OF THE DRAWINGS

Various embodiments of the invention are disclosed in the following detailed description and the accompanying drawings.

FIGS. 5A through 5D are block diagrams illustrating various embodiments of the clamp jaws of an interlocking lifting tool.

FIG. 5E is a block diagram illustrating an embodiment of the clamp jaws of an interlocking lifting tool in the closed position.

DETAILED DESCRIPTION

Figure 1A:
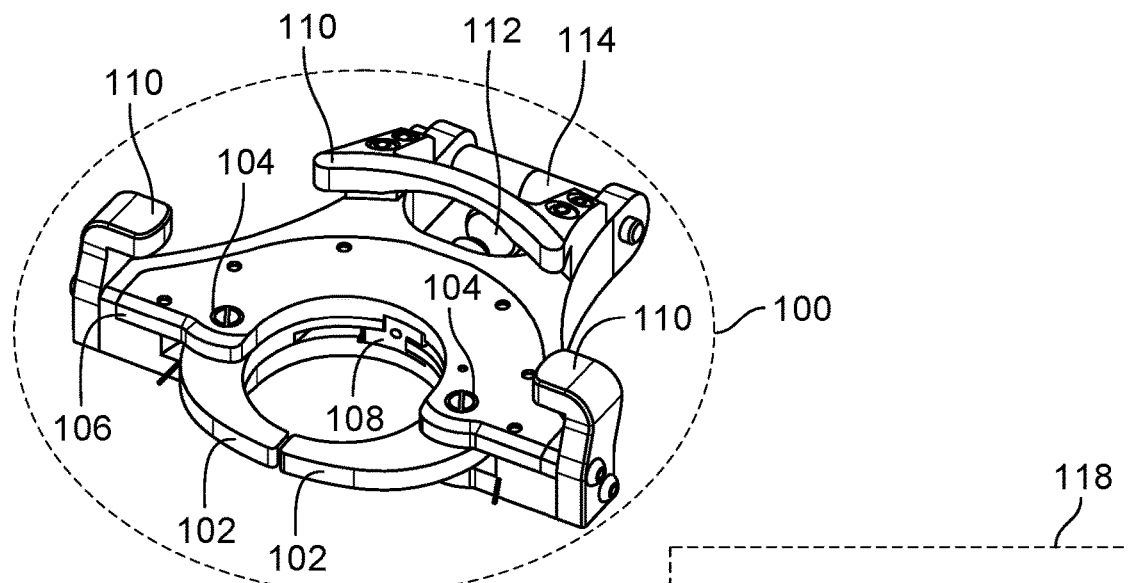
FIGS. 1A and 1B are block diagrams illustrating an embodiment of an interlocking lifting tool.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for securing and lifting an object is disclosed (i.e., an 'interlocking lifting tool'). The system comprises two or more clamp jaws, wherein the two or more clamp jaws are configured to lock around the object in response to the object being pressed against the inner profile of the clamp jaw, wherein the two or more clamp jaws unlock by moving a wedge lock key from a locking position, and wherein the wedge lock key prevents the two or more clamp jaws from moving in response to the wedge lock key being in the locking position.

In some embodiments, the system of the interlocking lifting tool further comprises an interlocking lifting tool system (e.g., to aid in securing and lifting the object). In various embodiments, the interlocking lifting tool system further comprises an other lifting tool, wherein the interlocking lifting tool and the other lifting tool are connected (e.g., via a lifting strap), or any other appropriate combination of one or more other lifting tools whether connected or not connected. In some embodiments, the interlocking lifting tool system comprises a lifting strap with a shackle (e.g., to aid in rotating the object about its center of gravity once lifted). In various embodiments, the other lifting tool comprises a second interlocking lifting tool, an other type of lifting tool, a clamp, a folding clamp, a fixture, a hinged fixture, a handle, etc., or any other appropriate type of lifting tool.

The disclosed interlocking lifting tool (ILT) is used to quickly and securely attach to an object (e.g., a heavy object) without the use of additional tools or without using more than one hand. The ILT is sufficiently compact and lightweight to be capable of being held and positioned using one hand. The ILT automatically closes and locks around the object when the ILT is pressed against a portion of the object that matches the inner profile of the ILT's clamp jaws. For example, two semi-circular shaped clamp jaws are designed to pivot open and shut around a cylindrical feature of the object (e.g., a cylindrical post). In some embodiments, radial springs are integrated into the ILT's design to push the clamp jaws open so that the ILT can be attached with one hand. In some embodiments, pivot points are used in the middle of the clamp jaws so that when the ILT assembly is pressed into the cylindrical feature, the semi-circular shaped clamp jaws pivot and close around the cylindrical feature. In some embodiments, the angle of the clamp jaws is designed so that the clamp jaws push back a spring-loaded wedge lock key until all three components (i.e., the two clamp jaws and the wedge lock key) lock into place. The design of the wedge lock key interfering with the opening of the semi-circular shaped clamp jaws ensures no unintended detachment. In some embodiments, a release knob is integrated into the design to pull back the wedge lock key thereby eliminating the interference between the two clamp jaws allowing them to spring open, thus releasing the cylindrical feature.

In some embodiments, the inner profile of the ILT's clamp jaw comprises a portion of an outer profile of the object. In various embodiments, the object outer profile comprises one of a circle, an ellipse, a rectangle, a square, a polygon, or any other appropriate outer profile. In some embodiments, the two or more clamp jaws are coupled to a tool body. In some embodiments, a clamp of the two or more clamps rotates around a pivot mounted on the tool body. In some embodiments, the tool body includes a fitting to prevent the object from moving in response to the two or more clamp jaws being locked around the object. In some embodiments, the fitting is configured to conform to a protuberance from the object. In various embodiments, the protuberance comprises one of an overhang, a projection, a flange, a pin, a spike, a lip, a bolt head, a screw head, a head, or any other appropriate type of protuberance.

In some embodiments, an ILT system connects the ILT to an other lifting tool, wherein the other lifting tool comprises a fixture or tool body designed to fit around a second portion of the object—for example, a handle feature (e.g., a handle feature comprising two lifting bolts attached to the object). For example, two halves of the other lifting tool are designed to fit around the handle feature, wherein the halves are attached by a shoulder bolt on one side—acting as a hinge to create a folding clamp. The other side of the halves is designed with through holes to allow a locking quick-release pin to pass through, thereby locking the halves shut around the handle feature. Removing the locking quick-release pin allows the halves to open and disconnect from the handle feature. The use of a locking quick release pin ensures no unintended detachment.

In some embodiments, a shackle with a roller is used so that a lifting strap connected between the ILT and the other lifting tool can travel across the roller, allowing the object to rotate about its center of gravity. In some embodiments, the roller comprises a rotating sleeve or bobbin.

In various embodiments, the length of the lifting strap is 400 mm, 500 mm, 600 mm, 677 mm, 725 mm, 838 mm, or any other appropriate length. In various embodiments, the width of the strap is 25 mm, 50 mm, 60 mm, 68 mm, 76 mm, 84 mm, or any other appropriate width. In various embodiments, the lifting strap comprises nylon, polyester, neoprene, metal (e.g., metal wire), cotton, leather, and/or any other appropriate combination of materials. In various embodiments, the lifting strap comprises a sling, a chain, a rope, or any other appropriate form of lifting strap.

In various embodiments, the dimensions of the ILT are 172 mm by 196 mm by 51 mm, 200 mm by 200 mm by 40 mm, 327 mm by 242 mm by 26 mm, or any other appropriate set of dimensions. In various embodiments, components of the ILT or the ILT system (e.g., the clamp jaws, the tool body, the cover plate, the release pin, the wedge lock key, the roller, the shackle, the other lifting tool, etc.) are made of metal (e.g., iron, steel, steel alloys, magnesium alloys, vanadium alloys, aluminum, titanium, nickel, chromium, inconel, etc.), polymer (e.g., polyethylene, polyvinyl chloride, polypropylene, polycarbonate, acrylic, acetal, nylon, acrylonitrile butadiene styrene, etc.), phenolic resin, epoxy, epoxy glass, carbon fiber, or any other appropriate type of material.

The disclosed ILT is an improvement over these other systems in that it can be used to quickly and securely attach to an object without the use of additional tools or without using more than one hand. In some embodiments, the ILT clamp jaws are substantially similar so they can be used interchangeably thereby decreasing ILT assembly complexity. The disclosed ILT system is an improvement over these other systems in that it can also aid in easily rotating the object once lifted.

Figure 1B:
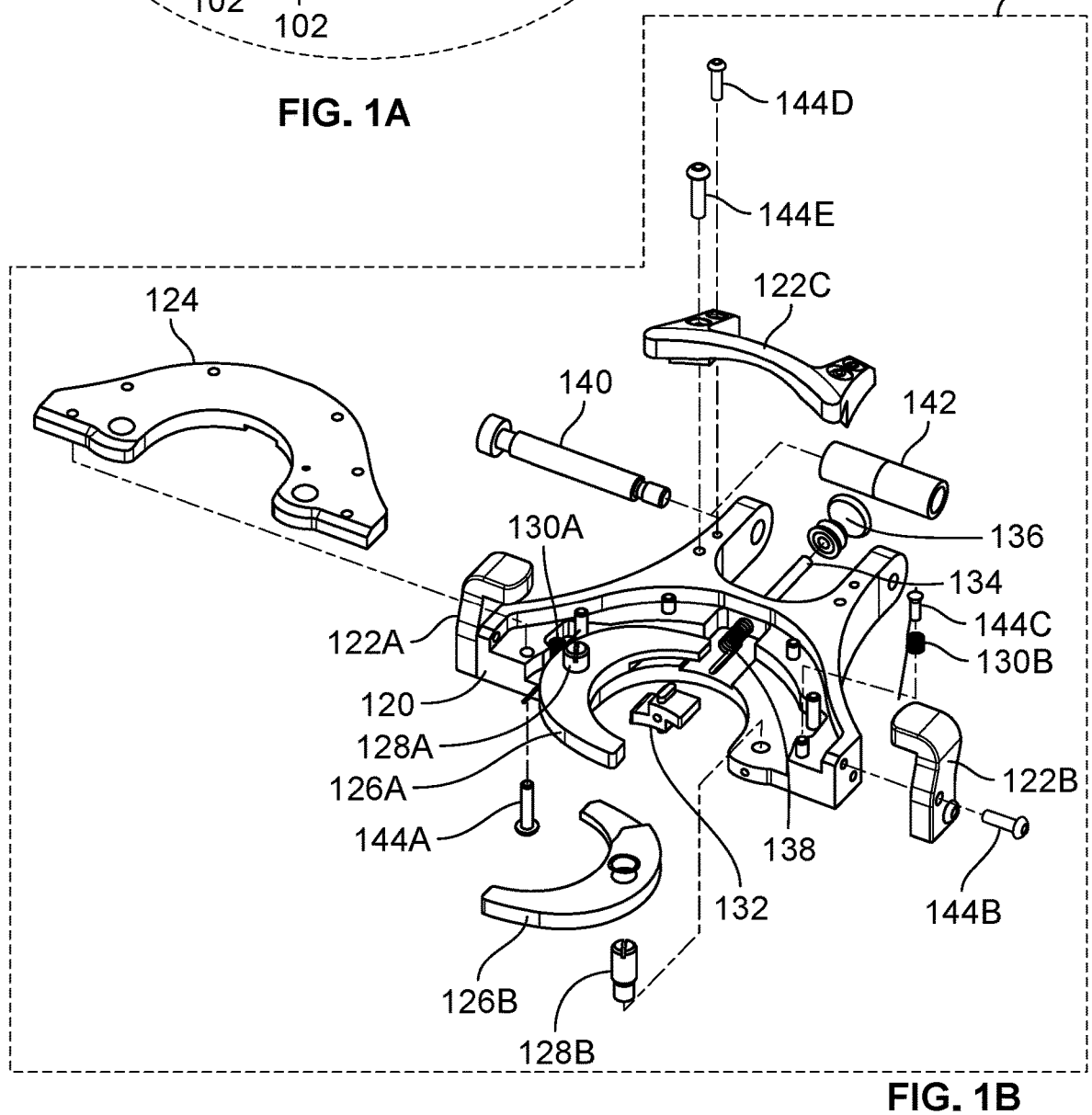

FIGS. 1A and 1B are block diagrams illustrating an embodiment of an interlocking lifting tool. In the example shown, FIG. 1A illustrates a perspective view of interlocking lifting tool (ILT) 100 in the closed position. ILT 100 comprises clamp jaws 102, clamp jaw pivot axes 104, cover plate 106, wedge lock key 108, guides 110, release knob 112, and strap pin sleeve 114. In response to release knob 112 being pulled towards strap pin sleeve 114, wedge lock key 108 (connected to release knob 112 by an interior release pin) is moved out of its closed position and allows interior radial springs (under cover plate 106) to open clamp jaws 102 (i.e., clamp jaws 102 pivot open around clamp jaw pivot axes 104). Clamp jaws 102 include arms that slide past each other. For example, one jaw (e.g., the first jaw) of clamp jaws 102 includes a cut out on an arm of the jaw that slides past an arm of the other jaw. The other jaw of clamp jaws 102 similarly includes a cut out on the arm of that jaw that slides past the arm of the first jaw. In some embodiments, a top half of one jaw and a bottom half of the other jaw are cut out to allow the two jaws to slide past one another. Wedge lock key 108 has a top half cut out on a side to fit one jaw's bottom half and a bottom half cut out on a side to fit a second jaw's top half. Wedge lock key 108 includes a protuberance that fits in a slot guide restricting its motion to one dimension (e.g., to slide into a locking position and to slide out of locking position). Wedge lock key 108 is actuated to move along the one dimension using a release knob which is coupled to a release pin which is coupled to wedge lock key 108. A linear spring pushes wedge lock key 108 into a locking position in response to clamp jaws 102 closing around an object (e.g., in response to clamp jaws 102 sliding past another to create a space between themselves that wedge lock key 108 fits into. In some embodiments, wedge lock key 108 has a cross section shape with a bottom half cut out on one side, a top and bottom half in existence in the middle, and a top half cut out on the other side (e.g., a shape in cross section "_" or "_"). In some embodiments, in the middle of the cross section there is a coupling to the release pin (e.g., a threaded hole to mate with threads on the release pin). In some embodiments, the release pin includes threads to mate with a threaded hole in release knob 112.

Guides 110 are used to align and guide ILT 100 around a corresponding protuberance of an object to be secured and lifted. In some embodiments, guides 110 are used to prevent the object from moving in response to clamp jaws 102 being locked around the object. For example, ILT 100 is designed to secure an object comprising a post with a flange. In this example, guides 110 are used to align and guide ILT 100 around the flange of the object and as ILT 100 is moved towards the post, clamp jaws 102 (in the open position) push back wedge lock key 108 until clamp jaws 102 and wedge lock key 108 lock into place around the post.

FIG. 1B illustrates an exploded perspective view of interlocking lifting tool (ILT) 118. In some embodiments, ILT 118 comprises ILT 100 of FIG. 1A. In the example shown, ILT 118 comprises tool body 120; guides 122A, 122B, and 122C; cover plate 124; clamp jaws 126A and 126B; clamp jaw pivot axes 128A and 128B; radial springs 130A and 130B; wedge lock key 132; release pin 134; release knob 136; linear spring 138; strap pin 140; strap pin sleeve 142; and fasteners 144A, 144B, 144C, 144D, and 144E.

In the example shown, fastener 144A is used to secure cover plate 124 to tool body 120. In some embodiments, more than one fastener is used to secure cover plate 124 to tool body 120.

In the example shown, fastener 144B is used to secure guide 122B to tool body 120. In some embodiments, more than one fastener is used to secure guide 122B to tool body 120.

In the example shown, fastener 144C is used to secure radial spring 130B to tool body 120. In some embodiments, more than one fastener is used to secure radial spring 130B to tool body 120.

In the example shown, fasteners 144D and 144E are used to secure guide 122C to tool body 120. In various embodiments, more or less than two fasteners are used to secure guide 122C to tool body 120.

In various embodiments, fasteners 144A, 144B, 144C, 144D, and 144E comprise screws, rivets, bolts, pins, or any other appropriate type of fastener.

In the example shown, strap pin 140 passes through an arm of tool body 120, through strap pin sleeve 142, and secured to an other arm of tool body 120 (e.g., secured using a snap clip, cotter pin, or any other appropriate type of fastener). In some embodiments, strap pin sleeve 142 passes through a lifting strap. In various embodiments, a lifting strap connected to strap pin sleeve 142 is used to attach an other lifting tool to generate an ILT system.

In the example shown, wedge lock key 132 is connected to release knob 136 via release pin 134 (e.g., connected via threaded ends of release pin 134, connected via soldering or welding, or connected by any other appropriate means). Release pin 134 passes through linear spring 138 which is held in place between wedge lock key 132 and tool body 120. Release pin 134 and release knob 136 are used to pull back the wedge lock key 132 thereby eliminating the interference between clamp jaws 126A and 126B and allowing radial springs 130A and 130B to cause clamp jaws 126A and 126B to spring open by pivoting around clamp jaw pivot axes 128A and 128B.

Figure 2:
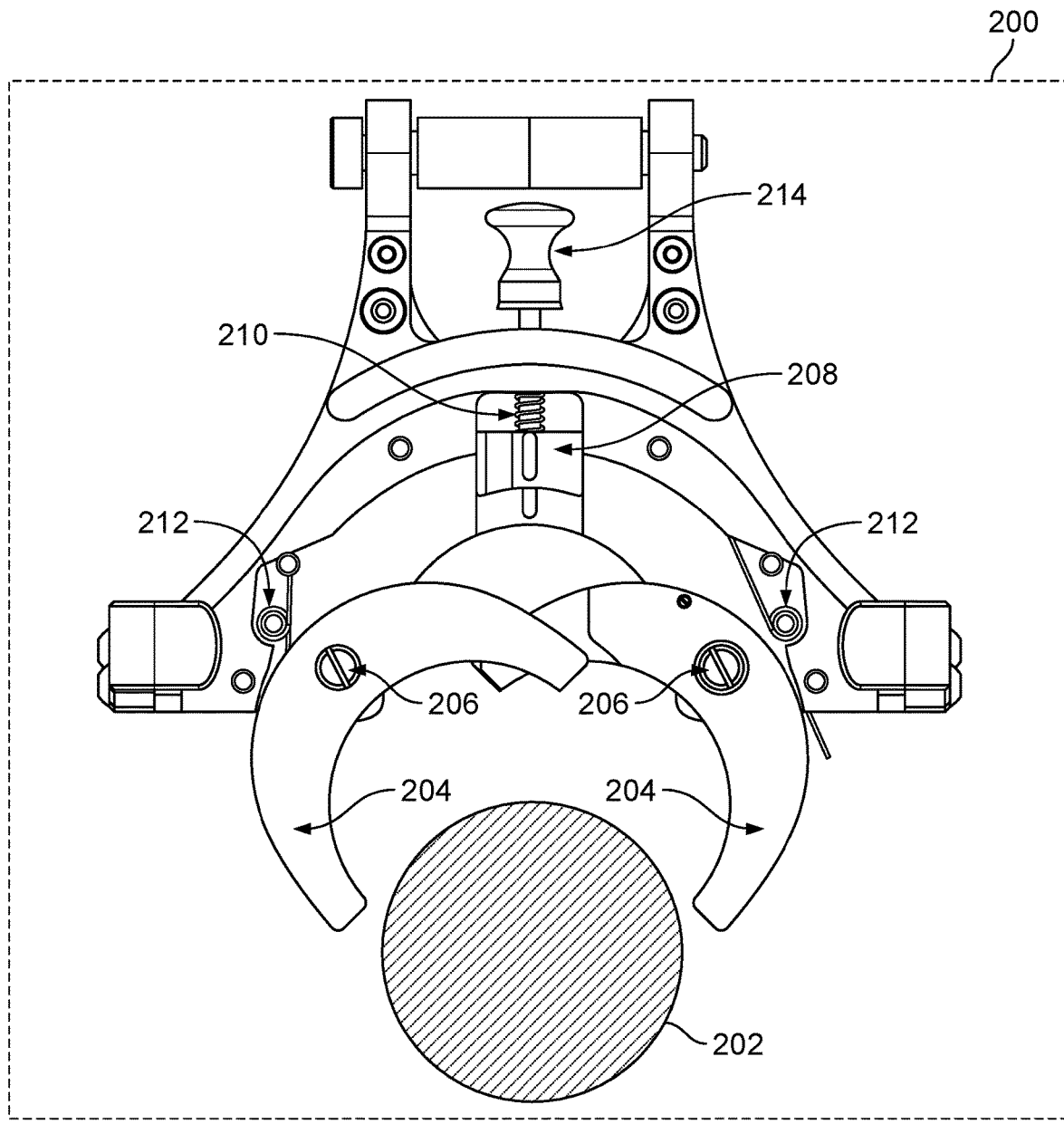
FIG. 2 is a block diagram illustrating an embodiment of an interlocking lifting tool in the open position.

FIG. 2 is a block diagram illustrating an embodiment of an interlocking lifting tool in the open position. In the example shown, 200 is an ILT in the open position poised to secure clamp jaws 204 around cylinder 202. In some embodiments, the ILT of 200 comprises ILT 100 of FIG. 1A. Radial springs 212 are used to open, and keep open, clamp jaws 204 in response to wedge lock key 208 being pulled back against linear spring 210 (e.g., pulled back using release knob 214 attached to wedge lock key 208). Clamp jaws 204 pivot around clamp jaw pivot axes 206 to release or accept cylinder 202. Clamp jaws 204 include arms that slide past each other. For example, one jaw (e.g., the first jaw) of clamp jaws 204 includes a cut out on an arm of the jaw that slides past an arm of the other jaw. The other jaw of clamp jaws 204 similarly includes a cut out on the arm of that jaw that slides past the arm of the first jaw. In some embodiments, a top half of one jaw and a bottom half of the other jaw are cut out to allow the two jaws to slide past one another. Wedge lock key 208 has a top half cut out on a side to fit one jaw's bottom half and a bottom half cut out on a side to fit a second jaw's top half. Wedge lock key 208 includes a protuberance that fits in a slot guide (e.g., a slot guide in tool body and/or cover plate) restricting its motion to one dimension (e.g., to slide into a locking position and to slide out of locking position). Wedge lock key 208 is actuated to move along the one dimension using release knob 214 which is coupled to a release pin which is coupled to wedge lock key 208. Wedge lock key 208 sits in a space in tool body in the unlocked position not engaged with clamp jaws 204 adjacent to the clamp jaws 204. Linear spring 210 pushes wedge lock key 208 into a locking position in response to clamp jaws 204 closing around an object (e.g., in response to clamp jaws 204 sliding past another to create a space between themselves that wedge lock key 208 fits into. In some embodiments, wedge lock key 208 has a cross section shape with a bottom half cut out on one side, a top and bottom half in existence in the middle, and a top half cut out on the other side (e.g., a shape in cross section "_" or "|_"). In some embodiments, in the middle of the cross section there is a coupling to a release pin (e.g., a threaded hole to mate with threads on the release pin). In some embodiments, the release pin includes threads to mate with a threaded hole in release knob 214.

Figure 3A:
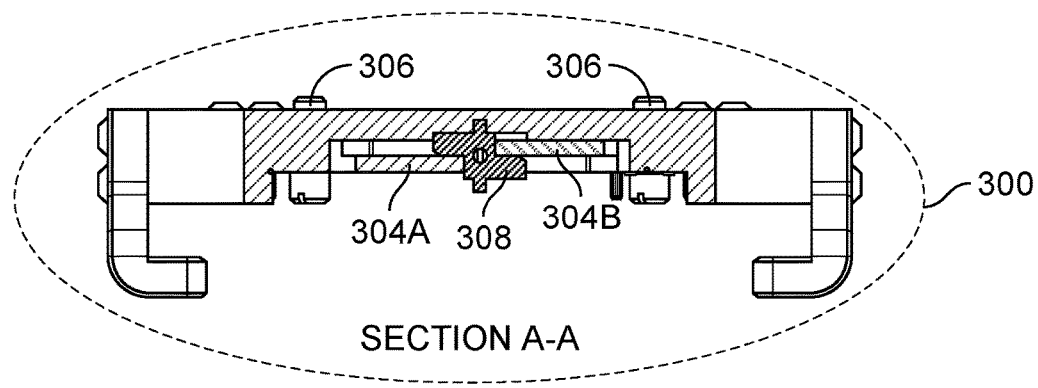
FIG. 3A is a block diagram illustrating a cross-section of an embodiment of an interlocking lifting tool.
Figure 3B:
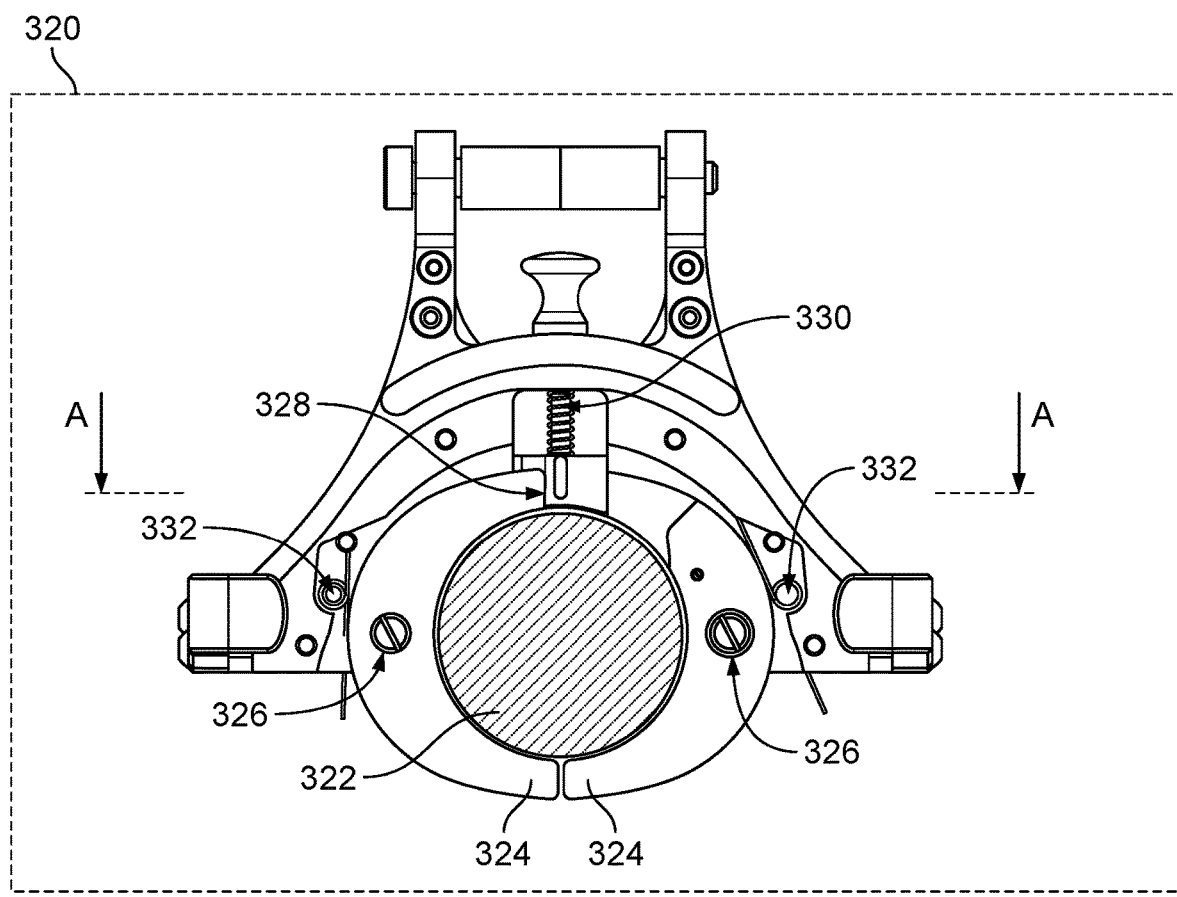
FIG. 3B is a block diagram illustrating an embodiment of an interlocking lifting tool in the closed position.

FIG. 3A is a block diagram illustrating a cross-section of an embodiment of an interlocking lifting tool. In the example shown, FIG. 3A is a cross-section through ILT 320 of FIG. 3B as indicated in FIG. 3B by the two lines labeled with 'A'. 304A and 304B are cross-section views of clamp jaws 324 of FIG. 3B. Clamp jaws 304A and 304B are being held closed by wedge lock key 308 which restricts clamp jaws 304A and 304B from pivoting open around clamp jaw pivot axes 306. Clamp jaws 304A and 304B include arms that slide past each other. For example, one jaw (e.g., the first jaw) of clamp jaws 304A and 304B includes a cut out on an arm of the jaw that slides past an arm of the other jaw. The other jaw of clamp jaws 304A and 304B similarly includes a cut out on the arm of that jaw that slides past the arm of the first jaw. In some embodiments, a top half of one jaw and a bottom half of the other jaw are cut out to allow the two jaws to slide past one another. Wedge lock key 308 has a top half cut out on a side to fit one jaw's bottom half and a bottom half cut out on a side to fit a second jaw's top half. Wedge lock key 308 includes a protuberance that fits in a slot guide (e.g., a slot guide in tool body and/or cover plate) restricting its motion to one dimension (e.g., to slide into a locking position and to slide out of locking position). Wedge lock key 308 is actuated to move along the one dimension using release knob which is coupled to a release pin which is coupled to wedge lock key 308. Wedge lock key 308 sits in a space in tool body in the unlocked position not engaged with clamp jaws 304A and 304B adjacent to the clamp jaws 304A and 304B. Linear spring pushes wedge lock key 308 into a locking position in response to clamp jaws 304A and 304B closing around an object (e.g., in response to clamp jaws 304A and 304B sliding past another to create a space between themselves that wedge lock key 308 fits into. In some embodiments, wedge lock key 308 has a cross section shape with a bottom half cut out on one side, a top and bottom half in existence in the middle, and a top half cut out on the other side (e.g., a shape in cross section " _|⎯ " or "⎯|_ "). In some embodiments, in the middle of the cross section there is a coupling to a release pin (e.g., a threaded hole to mate with threads on the release pin). In some embodiments, the release pin includes threads to mate with a threaded hole in release knob.

FIG. 3B is a block diagram illustrating an embodiment of an interlocking lifting tool in the closed position. In some embodiments, ILT 320 (without cylinder 322) comprises ILT 100 of FIG. 1A. In the example shown, ILT 320 is shown with clamp jaws 324 closed around cylinder 322. Linear spring 330 retains wedge lock key 328 in the closed position, thus ensuring clamp jaws 324 do not inadvertently release cylinder 322 by pivoting open around clamp jaw pivot axes 326. Radial springs 332 are used to cause clamp jaws 324 to pivot open in response to wedge lock key 328 being pulled out (e.g., in response to intentionally releasing cylinder 322). Clamp jaws 324 include arms that slide past each other. For example, one jaw (e.g., the first jaw) of clamp jaws 324 includes a cut out on an arm of the jaw that slides past an arm of the other jaw. The other jaw of clamp jaws 324 similarly includes a cut out on the arm of that jaw that slides past the arm of the first jaw. In some embodiments, a top half of one jaw and a bottom half of the other jaw are cut out to allow the two jaws to slide past one another. Wedge lock key 328 has a top half cut out on a side to fit one jaw's bottom half and a bottom half cut out on a side to fit a second jaw's top half. Wedge lock key 328 includes a protuberance that fits in a slot guide (e.g., a slot guide in tool body and/or cover plate) restricting its motion to one dimension (e.g., to slide into a locking position and to slide out of locking position). Wedge lock key 328 is actuated to move along the one dimension using release knob which is coupled to a release pin which is coupled to wedge lock key 328. Wedge lock key 328 sits in a space in tool body in the unlocked position not engaged with clamp jaws 324 adjacent to the clamp jaws 324. Linear spring 330 pushes wedge lock key 328 into a locking position in response to clamp jaws 324 closing around an object (e.g., in response to clamp jaws 324 sliding past another to create a space between themselves that wedge lock key 328 fits into. In some embodiments, wedge lock key 328 has a cross section shape with a bottom half cut out on one side, a top and bottom half in existence in the middle, and a top half cut out on the other side (e.g., a shape in cross section " _|¯ " or " ¯|_ "). In some embodiments, in the middle of the cross section there is a coupling to a release pin (e.g., a threaded hole to mate with threads on the release pin). In some embodiments, the release pin includes threads to mate with a threaded hole in release knob.

Figure 4A:
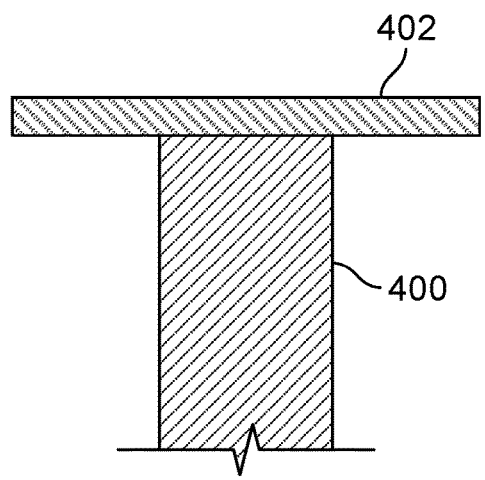
FIG. 4A is a block diagram illustrating a post and post flange.

FIG. 4A is a block diagram illustrating a post and post flange. In the example shown, post flange 402 is attached to post 400 (e.g., attached via a threaded connection, by soldering, welding, or by any other appropriate means of attachment). For example, post 400 and post flange 402 are attached to a larger object in need of securing and lifting. In the example shown, post 400 is circular. In various embodiments, post 400 comprises an outer profile that is elliptical, rectangular, square, polygonal, or any other appropriate outer profile.

Figure 4B:
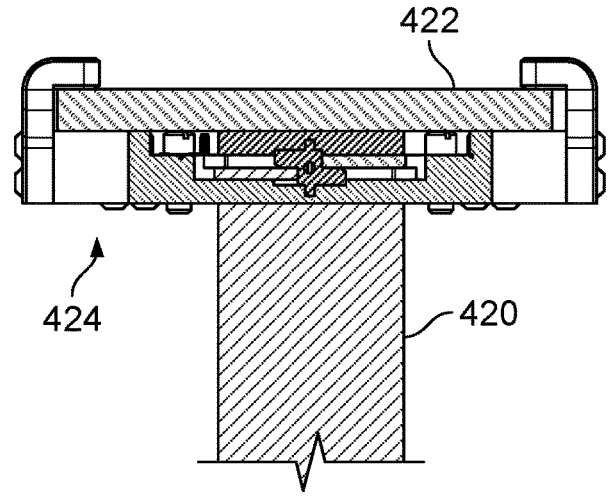
FIG. 4B is a block diagram illustrating the side view of an embodiment of an interlocking lifting tool attached to a post and post flange.

FIG. 4B is a block diagram illustrating the side view of an embodiment of an interlocking lifting tool attached to a post and post flange. In some embodiments, clamp 424 comprises ILT 100 of FIG. 1A. In the example shown, clamp 424 is shown in cross-section attached to post 420 and post flange 422. In some embodiments, post 420 and post flange 422 comprise post 400 and post flange 402 of FIG. 4A.

Figure 4C:
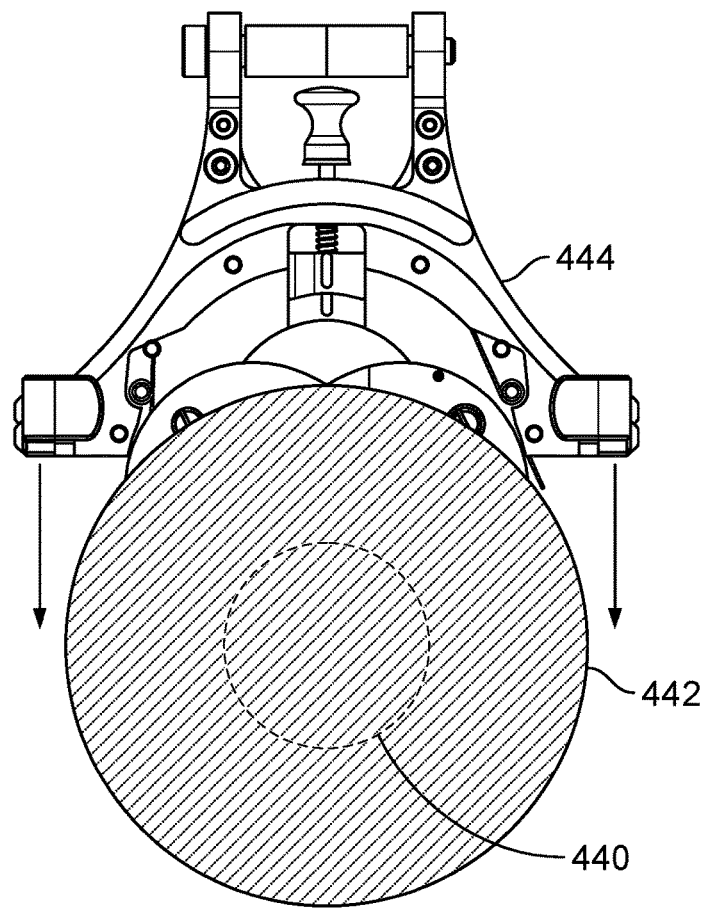
FIG. 4C is a block diagram illustrating the top view of an embodiment of an interlocking lifting tool being positioned to attach to a post and post flange.

FIG. 4C is a block diagram illustrating the top view of an embodiment of an interlocking lifting tool being positioned to attach to a post and post flange. In some embodiments, clamp 444 comprises ILT 100 of FIG. 1A. In the example shown, clamp 444 is viewed from the top while being guided into position around post flange 442 and post 440. In some embodiments, post 440 and post flange 442 comprise post 400 and post flange 402 of FIG. 4A.

FIGS. 5A through 5D are block diagrams illustrating various embodiments of the clamp jaws of an interlocking lifting tool. In the example shown in FIG. 5A, clamp jaw 500 and clamp jaw 504 are shown in the open position. Clamp jaw 500 pivots around clamp jaw pivot axis 502 and clamp jaw 504 pivots around clamp jaw pivot axis 506. In some embodiments, clamp jaw 500 and clamp jaw 504 comprise the clamp jaws 102 of FIG. 1A. The inner profile of clamp jaw 500 and clamp jaw 504 are designed to match the circular outer profile of post 508.

Figure 5A:
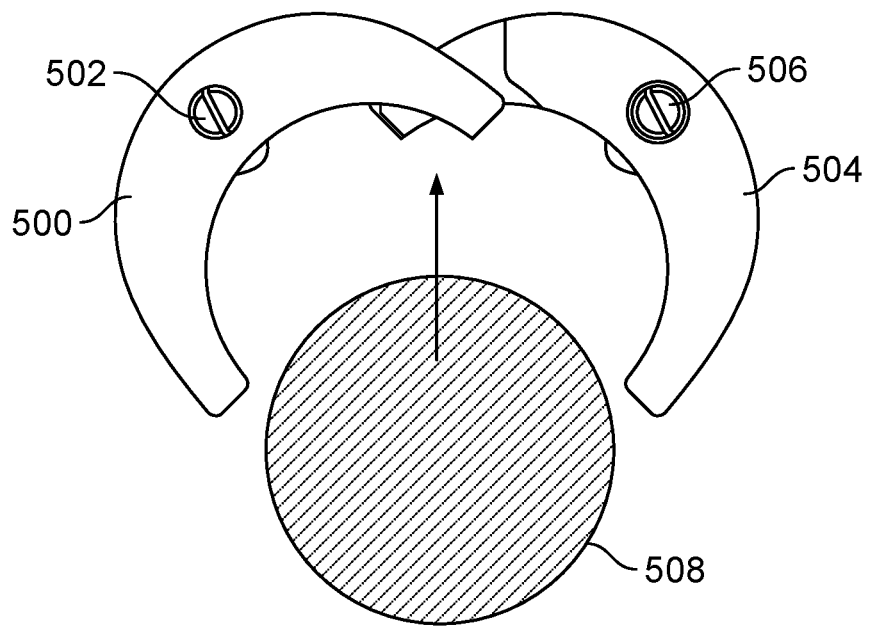
Figure 5B:
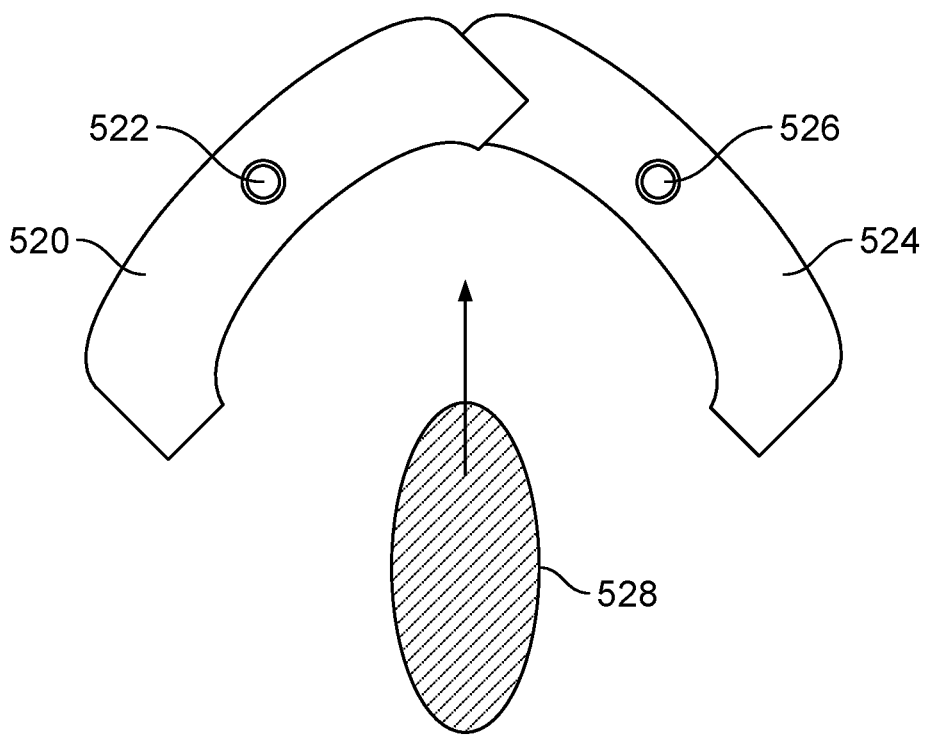

In the example shown in FIG. 5B, clamp jaw 520 and clamp jaw 524 are shown in the open position. Clamp jaw 520 pivots around clamp jaw pivot axis 522 and clamp jaw 524 pivots around clamp jaw pivot axis 526. In some embodiments, clamp jaw 520 and clamp jaw 524 replace the clamp jaws 102 of FIG. 1A. The inner profile of clamp jaw 520 and clamp jaw 524 are designed to match the elliptical outer profile of post 528.

In the example shown in FIG. 5C, clamp jaw 540 and clamp jaw 544 are shown in the open position. Clamp jaw 540 pivots around clamp jaw pivot axis 542 and clamp jaw 544 pivots around clamp jaw pivot axis 546. In some embodiments, clamp jaw 540 and clamp jaw 544 replace the clamp jaws 102 of FIG. 1A. The inner profile of clamp jaw 540 and clamp jaw 544 are designed to match the triangular outer profile of post 548.

In the example shown in FIG. 5D, clamp jaw 560 and clamp jaw 564 are shown in the open position. Clamp jaw 560 pivots around clamp jaw pivot axis 562 and clamp jaw 564 pivots around clamp jaw pivot axis 566. In some embodiments, clamp jaw 560 and clamp jaw 564 replace the clamp jaws 102 of FIG. 1A. The inner profile of clamp jaw 560 and clamp jaw 564 are designed to match the hexagonal outer profile of post 568.

FIG. 5E is a block diagram illustrating an embodiment of the clamp jaws of an interlocking lifting tool in the closed position. In some embodiments, the clamp jaws, clamp jaw pivot axes, and post of FIG. 5E comprise the clamp jaws, clamp jaw pivot axes, and post of FIG. 5D. Clamp jaw 580 is shown having pivoted around clamp jaw pivot axis 582 and clamp jaw 584 is shown having pivoted around clamp jaw pivot axis 586 to reach a closed position around hexagonal post 588.

Figure 6:
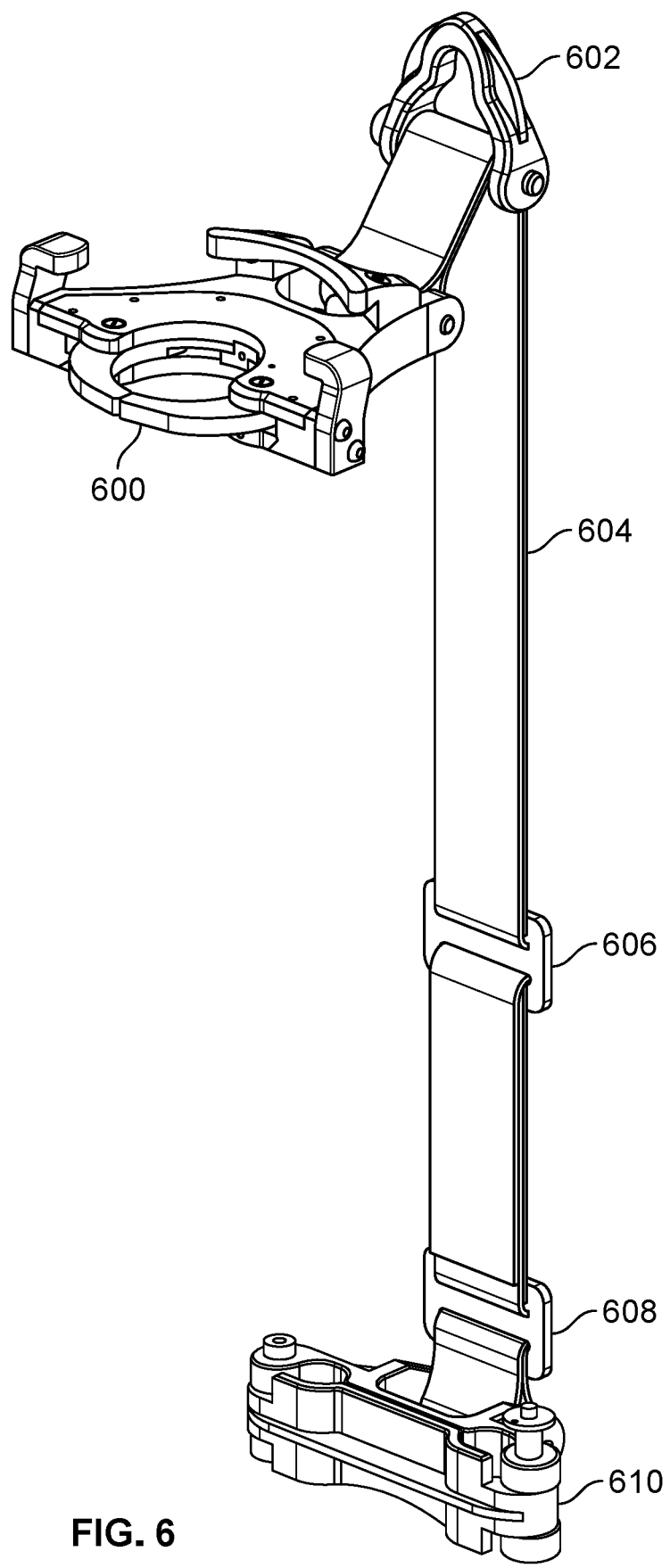
FIG. 6 is a block diagram illustrating an embodiment of an interlocking lifting tool connected by a strap to a lifting fixture.

FIG. 6 is a block diagram illustrating an embodiment of an interlocking lifting tool connected by a strap to a lifting fixture. In the example shown, ILT 600 is connected to lifting fixture 610 via strap 604. In some embodiments, ILT 600 comprises ILT 100 of FIG. 1A. Strap 604 passes through shackle 602 (e.g., passes over a roller pin of shackle 602), through strap plate 606, and through strap plate 608. In some embodiments, strap 604 is adjustable in length (e.g., via strap plate 606 and/or strap plate 608). In some embodiments, strap 604 is fixed in length (e.g., strap plate 606 and strap plate 608 are absent). In various embodiments, strap plate 606 and/or strap plate 608 are used to connect a next section of strap to a first section of strap. In some embodiments, lifting fixture 610 comprises a clamp (e.g., a folding clamp).

In the example shown, ILT 600 is used to attach to a post and post flange of circular profile and lifting fixture 610 is used to attach to a pair of bolts attached to a portion of an object also attached to the post and post flange of circular profile.

Figure 7:
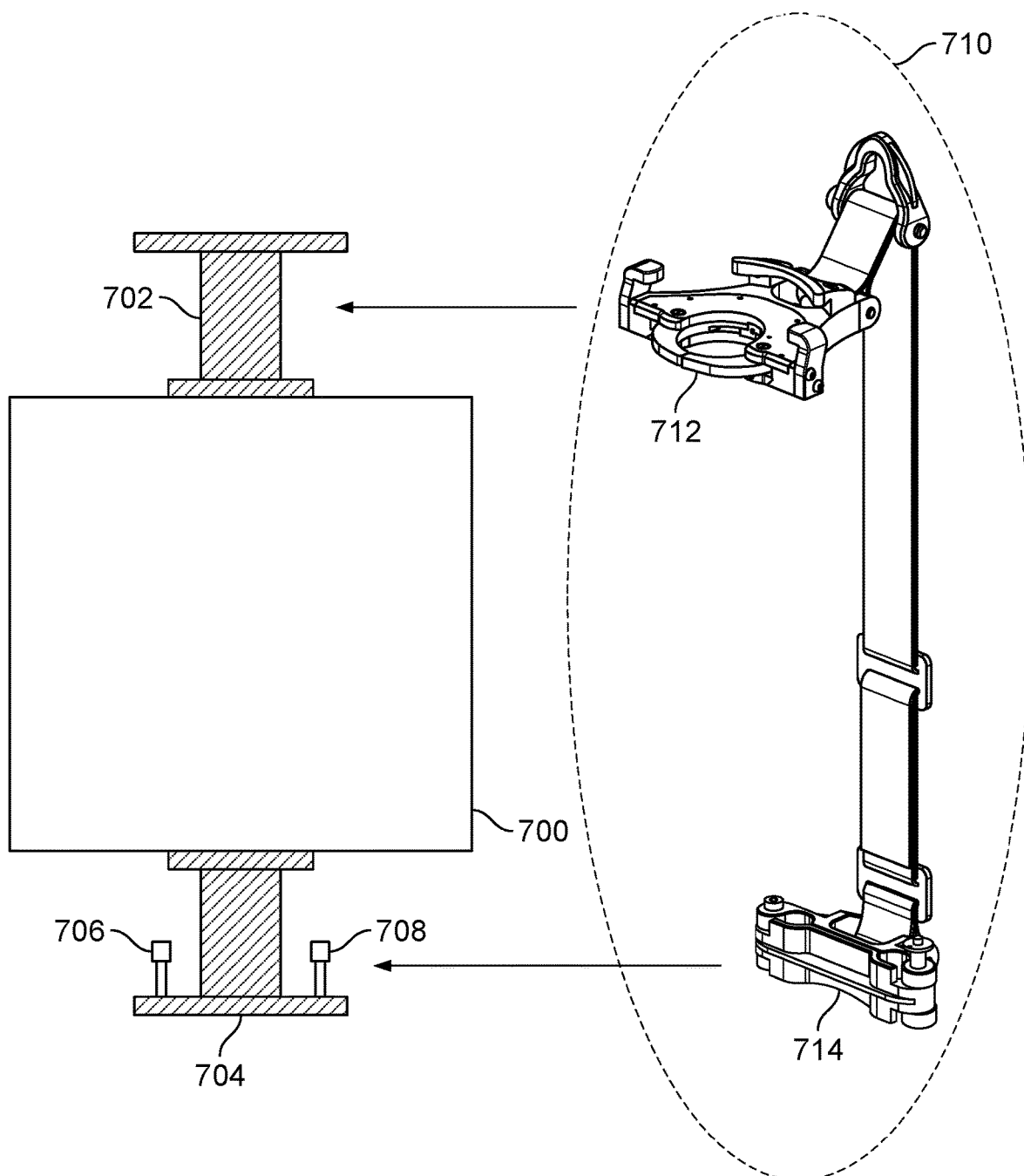
FIG. 7 is a block diagram illustrating an embodiment of an interlocking lifting tool system being positioned to attach to an object.

FIG. 7 is a block diagram illustrating an embodiment of an interlocking lifting tool system being positioned to attach to an object. In some embodiments, ILT system 710 comprises the ILT system of FIG. 6. In the example shown, post and post flange 702 is attached to object 700 (e.g., via a threaded connection, with screws or bolts, by soldering, welding, or by any other appropriate means of attachment). In some embodiments, object 700 is a heavy payload—for example, object 700 comprises mechanical and/or electrical equipment (e.g., a power unit, a sensor system, a pan tilt unit, etc.). In the example shown, post and post flange 704 is also attached to object 700, wherein bolt 706 and bolt 708 are attached to post and post flange 704 (e.g., bolt 706 and bolt 708 are threaded into tapped holes in the flange plate of post and post flange 704). In the example shown, ILT system 710 is shown being moved into position to attach ILT 712 to post and post flange 702 and to attach lifting fixture 714 to bolt 706 and bolt 708.

Figure 8A:
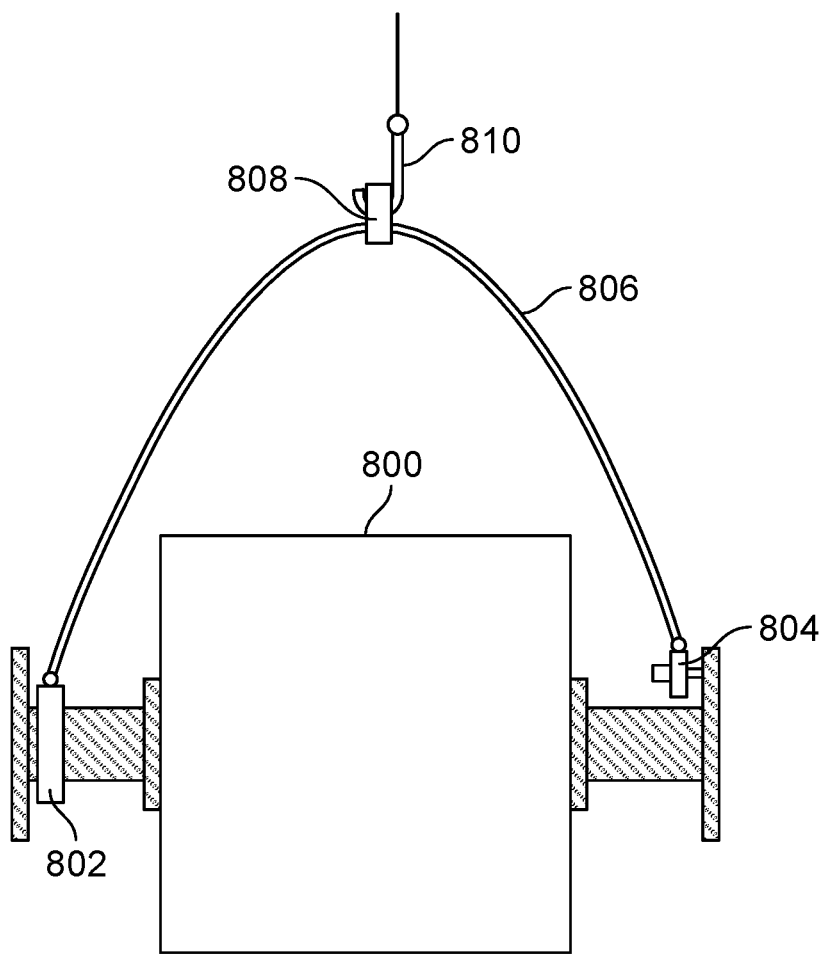
FIGS. 8A and 8B are block diagrams illustrating an embodiment of an interlocking lifting tool system being used to lift and rotate an object.
Figure 8B:
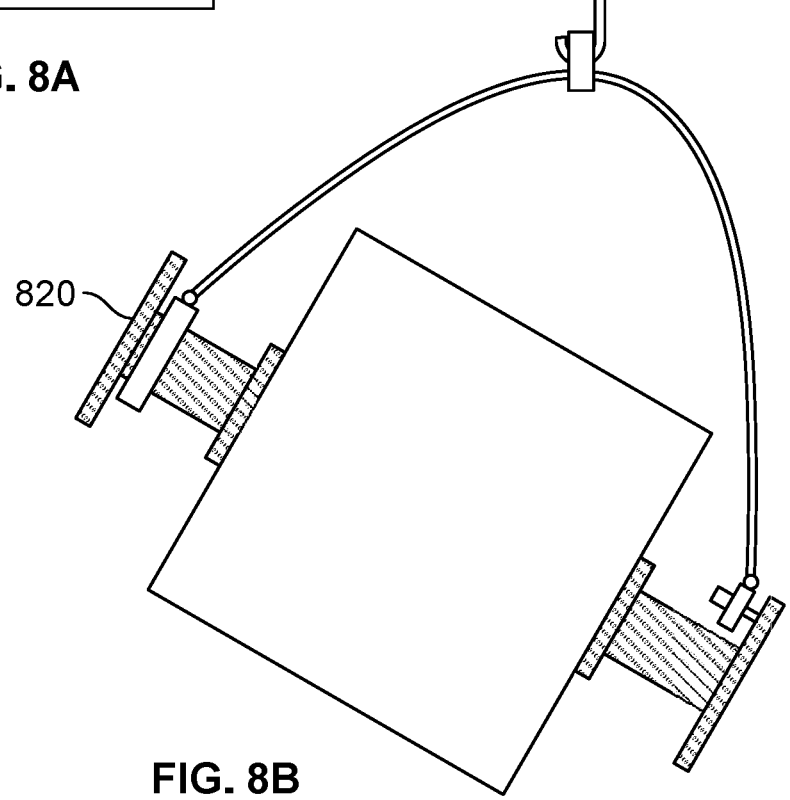

FIGS. 8A and 8B are block diagrams illustrating an embodiment of an interlocking lifting tool system being used to lift and rotate an object. In FIG. 8A, an ILT system comprising ILT 802, lifting fixture 804, lifting strap 806, and shackle 808 is shown attached to object 800. In some embodiments, the ILT system of FIG. 8A comprises the ILT system of FIG. 6. In some embodiments, object 800 comprises object 700 of FIG. 7. In the example shown, lifting hook 810 is attached to shackle 808 and used to lift object 800 (e.g., using a hoist, a crane, block and tackle, a gantry, a windlass, etc.).

FIG. 8B illustrates an object being lifted and rotated via a lifting strap and shackle. In the example shown, system 820 comprises the system of FIG. 8A rotating about its center of gravity (e.g., as rotated by a person pushing or lifting on one side or the other of system 820). In some embodiments, the lifting strap of system 820 slides over a roller or bobbin in the shackle of system 820.

Figure 9A:
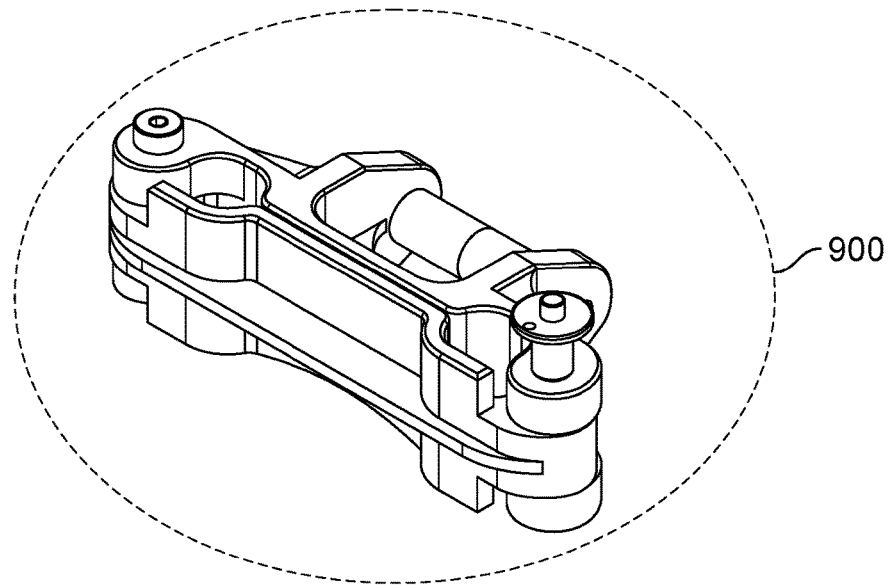
FIGS. 9A and 9B are block diagrams illustrating an embodiment of a lifting fixture.
Figure 9B:
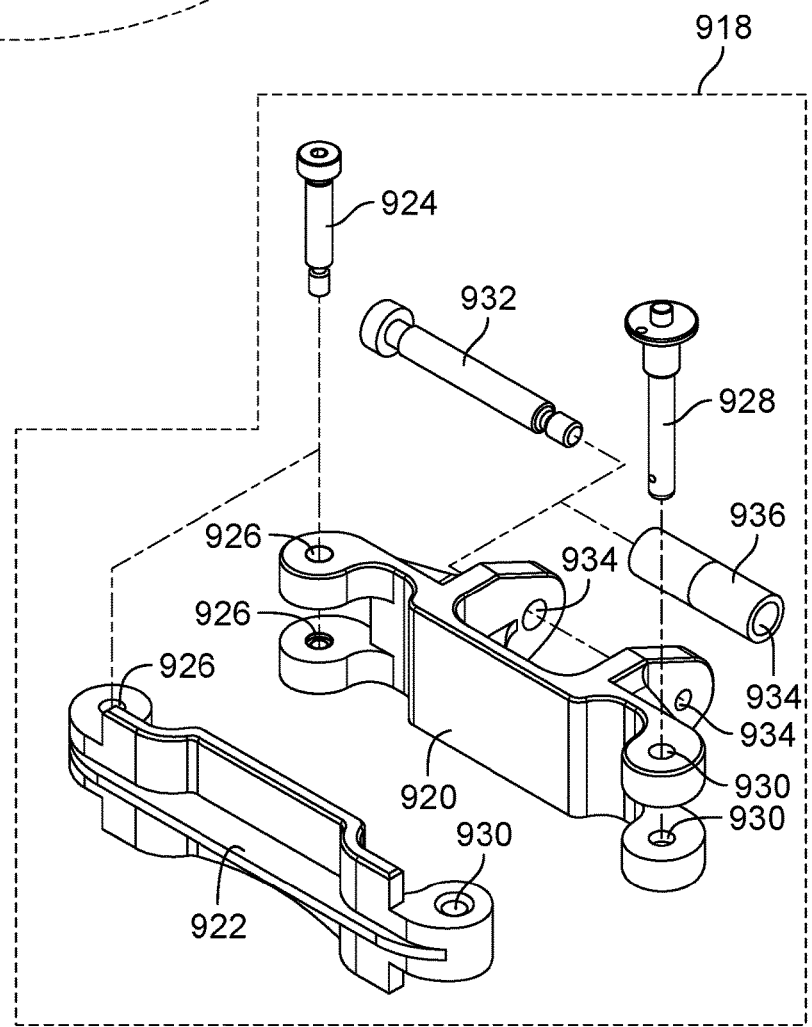

FIGS. 9A and 9B are block diagrams illustrating an embodiment of a lifting fixture. FIG. 9A illustrates lifting fixture 900 in the collapsed (i.e., closed) position. In some embodiments, lifting fixture 900 comprises lifting fixture 610 of FIG. 6.

FIG. 9B illustrates an exploded view of lifting fixture 918. In some embodiments, lifting fixture 918 comprises lifting fixture 900 of FIG. 9A. In the example shown, lifting fixture 918 comprises fixture body 920, hinge arm 922, hinge pin 924, quick-release pin 928, strap pin 932, and strap pin sleeve 936. Hinge arm 922 is connected to fixture body 920 by inserting hinge pin 924 into holes 926. Hinge arm 922 rotates around hinge pin 924 enabling lifting fixture 918 to open or close. When lifting fixture 918 is in the closed position, quick-release pin 928 is used to secure hinge arm 922 to fixture body 920 by being inserted into holes 930. Strap pin 932 is connected to lifting fixture 918 by being inserted through holes 934, first passing through an arm of fixture body 920, then through strap pin sleeve 936, into a second arm of fixture body 920 and secured (e.g., using a snap clip, cotter pin, or any other appropriate type of fastener).

Figure 10A:
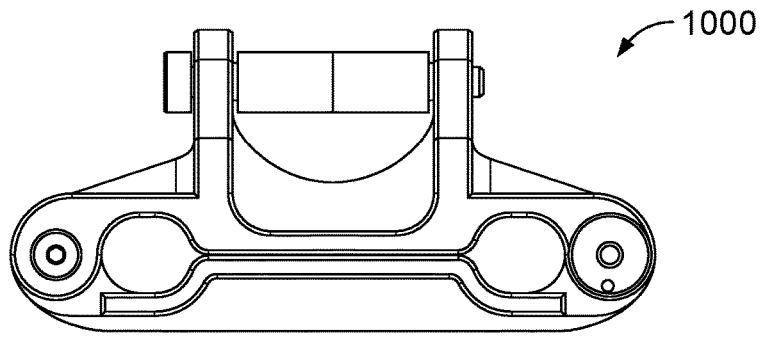
FIGS. 10A through 10C are block diagrams illustrating closed and open views of an embodiment of a lifting fixture.
Figure 10B:
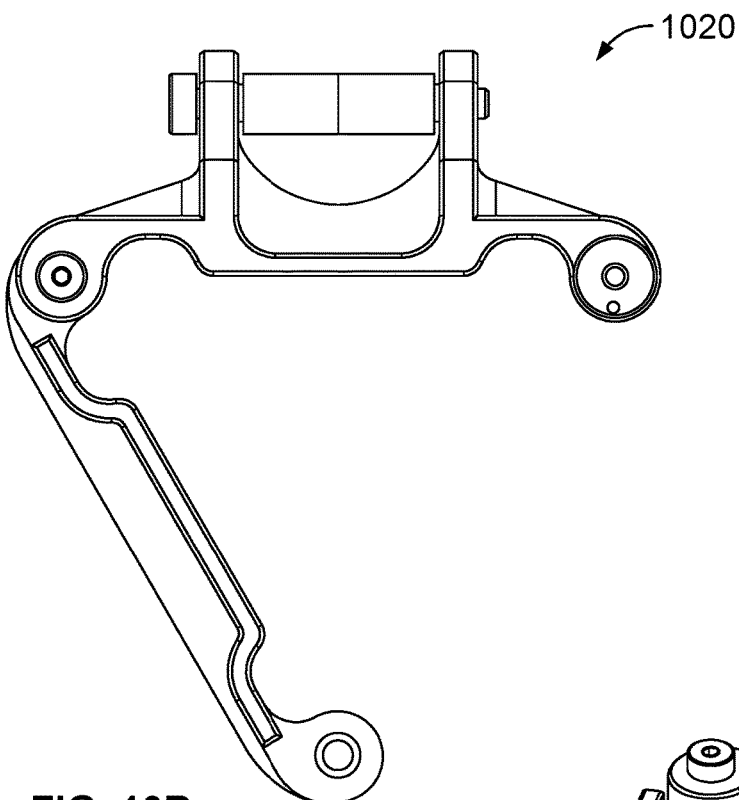
Figure 10C:
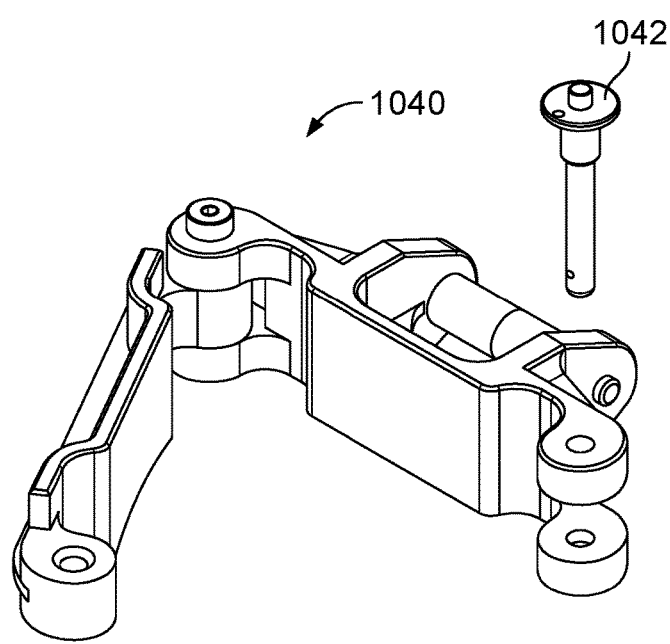

FIGS. 10A through 10C are block diagrams illustrating closed and open views of an embodiment of a lifting fixture. In some embodiments, the lifting fixtures of FIGS. 10A through 10C comprise lifting fixture 610 of FIG. 6. In FIG. 10A, lifting fixture 1000 is shown in the closed position. In FIG. 10B, lifting fixture 1020 is shown in the open position. In FIG. 10C, lifting fixture 1040 is shown in the open position with quick-release pin 1042 shown over the holes used to secure lifting fixture 1040 in response to being moved to its closed position.

Figure 11:
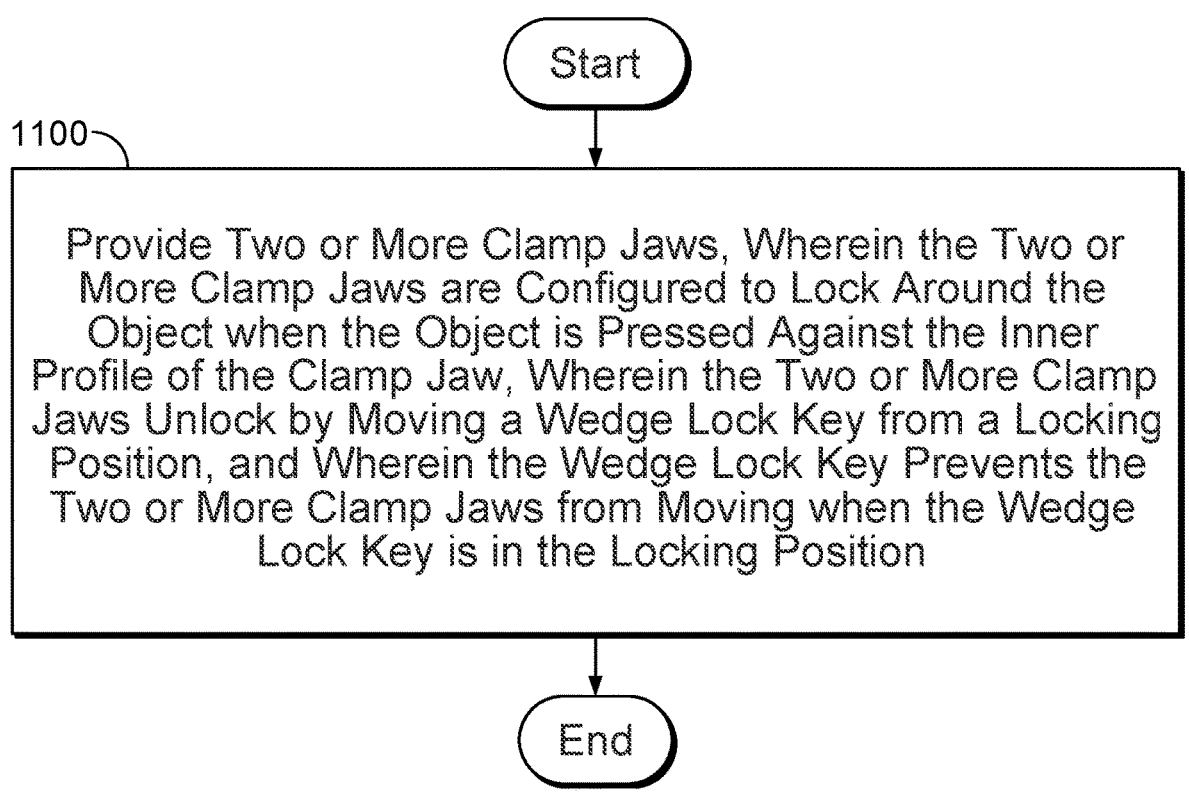
FIG. 11 is a flow diagram illustrating an embodiment of a method for providing an interlocking lifting tool.

FIG. 11 is a flow diagram illustrating an embodiment of a method for providing an interlocking lifting tool. In 1100, two or more clamp jaws are provided, wherein the two or more clamp jaws are configured to lock around the object when the object is pressed against the inner profile of the clamp jaw, wherein the two or more clamp jaws unlock by moving a wedge lock key from a locking position, and wherein the wedge lock key prevents the two or more clamp jaws from moving when the wedge lock key is in the locking position, and the process ends. For example, two or more clamp jaws are provided, wherein the two or more clamp jaws are configured to lock around the object in response to the object being pressed against the inner profile of the clamp jaw, wherein the two or more clamp jaws unlock by moving a wedge lock key from a locking position, and wherein the wedge lock key prevents the two or more clamp jaws from moving in response to the wedge lock key being in the locking position.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
two or more clamp jaws, wherein the two or more clamp jaws are configured to lock around an object in response to the object being pressed against an inner profile of a clamp jaw of the two or more clamp jaws, wherein the two or more clamp jaws unlock by moving a wedge lock key from a locking position, wherein the wedge lock key prevents the two or more clamp jaws from moving in response to the wedge lock key being in the locking position, wherein the two or more clamp jaws are coupled to a tool body, and wherein the tool body includes a coupler for a strap.

2. The system of claim 1, wherein the clamp jaw of the two or more clamp jaws has the inner profile configured to hold an object.

3. The system of claim 1, wherein the two or more clamp jaws are configured to close around the object in response to the object being pressed against the inner profile of the clamp jaw of the two or more clamp jaws.

4. The system of claim 1, wherein the lock around the object is caused by the wedge lock key moving into the locking position.

5. The system of claim 4, wherein the wedge lock key resists moving out of the locking position in response to the two or more clamp jaws being locked around the object.

6. The system of claim 1, wherein the two or more clamp jaws open in response to moving a wedge lock key from a locking position.

7. The system of claim 6, wherein the two or more clamp jaws open using a spring.

8. The system of claim 6, wherein the wedge lock key moves from a locking position using release knob coupled to the wedge lock key.

9. The system of claim 1, where in the inner profile comprises a portion of an outer profile of the object.

10. The system of claim 9, wherein the object outer profile comprises one of a circle, an ellipse, a rectangle, a square, or a polygon.

11. The system of claim 1, wherein the clamp jaw of the two or more clamp jaws rotates around a pivot mounted on the tool body.

12. The system of claim 1, wherein the tool body includes a fitting to prevent the object from moving in response to the two or more clamp jaws being locked around the object.

13. The system of claim 12, wherein the fitting is configured to conform to a protuberance from the object.

14. The system of claim 13, wherein the protuberance comprises one of an overhang, a projection, a flange, a pin, a spike, a lip, a bolt head, a screw head, or a head.

15. The system of claim 1, wherein the coupler comprises a rod with a rotating sleeve or bobbin.

16. The system of claim 1, wherein the strap is further coupled to a second tool body with a clamp.

17. The system of claim 16, wherein the clamp comprises a second set of two or more clamp jaws.

18. The system of claim 16, wherein the clamp comprises a folding clamp.

19. A method, comprising:
   providing two or more clamp jaws, wherein the two or more clamp jaws are configured to lock around an object in response to the object being pressed against an inner profile of a clamp jaw of the two or more clamp jaws, wherein the two or more clamp jaws unlock by moving a wedge lock key from a locking position, and wherein the wedge lock key prevents the two or more clamp jaws from moving in response to the wedge lock key being in the locking position, wherein the two or more clamp jaws are coupled to a tool body, and wherein the tool body includes a coupler for a strap.

\* \* \* \* \*